United States Patent [19]
Reiter

[11] 3,936,700
[45] Feb. 3, 1976

[54] ELECTRONIC OVERCURRENT PROTECTION OF A DC DATA TRANSMISSION CIRCUIT

[75] Inventor: Herbert Reiter, Munich, Germany

[73] Assignee: Siemens Aktiengesellschaft, Munich, Germany

[22] Filed: Dec. 4, 1974

[21] Appl. No.: 529,494

[30] Foreign Application Priority Data
Dec. 5, 1973    Germany............................ 2360689

[52] U.S. Cl.................. 317/22; 307/235 P; 317/23; 328/164
[51] Int. Cl.² .......................................... H02H 5/00
[58] Field of Search ......... 317/22, 23, 33 R, 36 TD; 340/253 A, 253 S; 328/116, 164; 307/235 N, 235 P

[56] References Cited
UNITED STATES PATENTS

| | | | |
|---|---|---|---|
| 2,866,896 | 12/1958 | Stampfl............................ | 328/164 |
| 3,611,162 | 10/1971 | Tochitani....................... | 307/235 N |
| 3,806,915 | 4/1974 | Higgins et al.................. | 307/235 N |

Primary Examiner—J. D. Miller
Assistant Examiner—Harry E. Moose, Jr.
Attorney, Agent, or Firm—Schuyler, Birch, Swindler, McKie & Beckett

[57] ABSTRACT

An overcurrent-protection network for a transmission line logic system is disclosed, including a line switch in said line subject to over-current conditions and an added threshold-responsive logic element whose output in response to detection of over-current conditions triggers said protected logic elements to open said line switch via a over-current condition responsive gate whose output supplies a control signal to the line switch. A supplementary network is provided to reclose said switch; this may comprise a time-delay mechanism for resetting a bi-stable element whose output controls said switch after a reasonable interval. Alternatively, the supplementary network may comprise a resistor bridging the switch to maintain minimal current flow to said protected logic elements, which thereby are responsive to the next succeeding change in line current or signal, to change state and re-close said line switch, thereby restoring initial conditions.

9 Claims, 4 Drawing Figures

ELECTRONIC OVERCURRENT PROTECTION OF A DC DATA TRANSMISSION CIRCUIT

BACKGROUND OF THE INVENTION

The invention relates to a circuit arrangement for protecting a transmission circuit - over which, for example, DC signals are transmitted and interpreted by means of threshold logic elements - from over-current damage by means of a line switch.

One problem when transmitting DC signals is that when faults occur, the current in the loop of the transmission line can be many times the customary operating current. However, since many sensitive circuit elements, e.g., transmitters, receivers, weighting networks, etc. are in series with the transmission circuit, over-current situations must be detected, and the current cut-off, as quickly as possible. Previously, protective elements were connected in series to the transmission circuits. For example, PTC thermistors were used which heat up when the current increases and whose resistance rises because of the higher temperature, or electronic fuses, e.g., simple transistor circuits were incorporated. The drawbacks of such circuit elements are that during normal use there occurs an additional voltage drop thereacross; further, the automatic resetting of an electronic fuse can only take place with great difficulty when used in a trunk line.

SUMMARY OF THE INVENTION

One object of the invention is to provide a circuit arrangement for protecting a DC transmission circuit from over-current damage, wherein no additional voltage drop occurs in normal operation and which, upon the occurrence of an over-current situation, eliminates the effect thereof through the actuation of a line switch; after the error has been removed, the normal state of the transmission circuit should be automatically restored. The invention proceeds on the assumption that the receiver circuit being protected includes at least two threshold logic elements for the purpose of interpreting the DC signals.

In accordance with the invention, the foregoing and other objects are achieved in that in addition to the first and second threshold logic elements for the interpretation of the DC signals, there is provided a third threshold element for detecting the over-current condition. When the preset threshold thereof is exceeded, this third threshold element controls the outputs of at least one of the two normally operative threshold elements so that at the outputs thereof a unique or paradoxical logical indication of the state of the conduction current is presented. An additional logic circuit is connected between the first and second threshold elements and a logic controlled line switch to interpret said unique signals and in response opens the line switch. An additional monitoring circuit is also provided which automatically reverses the output signal of the logic circuit, thereby reclosing the line switch and restoring normal operating conditions.

One advantage of the invention is that the available threshold logic elements are employed for the interpretation of the DC signals and development of the over-voltage indication. The line switch, which is also available, is used in conjunction with an easily constructed logic circuit for the protection of the transmission circuit from the over-current condition. Moreover, no substantial additional voltage drop occurs due to the occurrent protection logic; and the old line condition is capable of being automatically re-established.

In an especially useful embodiment of the invention, an additional monitoring circuit is provided including a timing element that again reverses the output signal of the additional logic circuit a specified period of time after the opening of the line switch, thereby reclosing the line switch and restoring normal operation.

An alternative embodiment of the invention is characterized by an arrangement wherein the line switch is bridged by a high-value resistor over which a weak measuring or testing current flows after the opening of the line switch. Thus the next succeeding change of the measuring current during the sampling of the line is detected by means of a further logic element and the line switch is reclosed in response to the detected signal.

BRIEF DESCRIPTION OF THE DRAWINGS

The principles of the invention will be more readily understood by reference to the description of a preferred embodiment given hereinbelow in conjunction with the four-figure drawing, which is a schematic diagram of an electronic protection circuit constructed according to the invention, wherein.

DESCRIPTION OF PREFERRED EMBODIMENT

Figure 1:
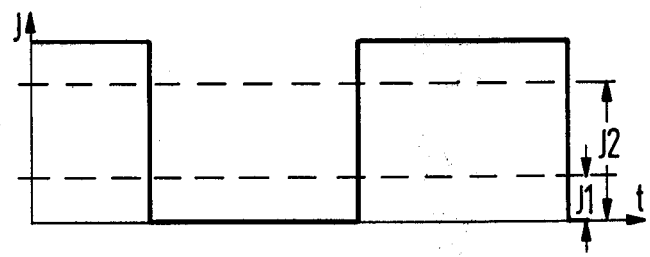
FIG. 1 indicates double threshold detection of unipolar current signals.

FIG. 1 shows a current flow J as a function of the time t. It illustrates unipolar current signals such as used in data transmission. To interpret said single-current signals, which are sent over fairly long transmission circuits and which frequently arrive in the receiver in heavily distorted form, two threshold circuits may be provided that respond to current values in excess of levels J1 or J2 respectively with an appropriate output indication.

Distortion of the DC signals can be reduced by means of the threshold logic elements mentioned above.

Figure 2:
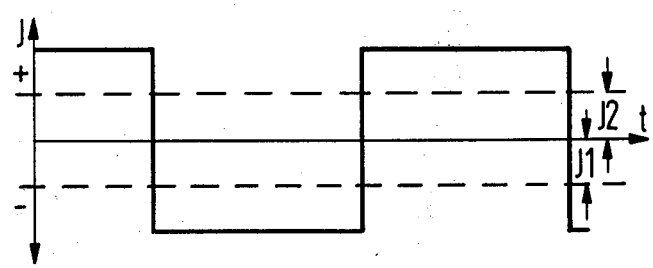
FIG. 2 indicates a double threshold detection of bipolar current signals.

The interpretation of bipolar current signals can likewise take place by means of two threshold logic elents in the same way as the interpretation of unipolar current signals by means of two threshold elements. A current flow comprising bipolar current signals is shown in FIG. 2 for this purpose. The negative portion of the bipolar current signals is detected by the threshold logic element responsive to the current J1 and the positive portion of the bipolar current signals by the threshold circuit responsive to the current J2.

Figure 3:
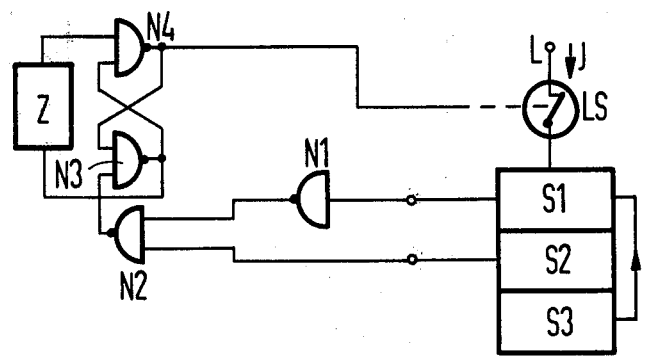
FIG. 3 shows an overcurrent logic circuit especially useful for unipolar current signal transmission.

FIG. 3 shows an exemplary embodiment of a circuit utilizing threshold logic elements for protecting the data transmission circuit from the effects of overcurrent conditions. This arrangement is advised for use in transmission systems carrying unipolar current signals.

A line switch LS and three threshold logic elements S1, S2 and S3 are connected in series with the transmission circuit L. The outputs of the threshold elements S1 and S2 are connected to a logic circuit comprising gates N1 to N4, the output of said logic circuit being connected to the control input of the line switch LS. Moreover, a timing element Z is provided connected to the line switch controlling logic circuit.

The mode of operation of the circuit arrangement shown in FIG. 3 is as follows: The threshold elements S1, S2 and S3 indicate whether a given conduction current ever is exceeded or not by means of specified output signals therefrom. By way of example, the threshold element S1 may respond to the current J1 (cf. FIG. 1) and the threshold element S2 respond to the current J2 (cf. FIG. 1). On the other hand, the threshold S3 is set to detect a current value lying considerably above the current J2 which is exceeded upon the occurrence of a faulty overcurrent. Such threshold can be simply constructed, for example, by means of differential amplifiers. As the unipolar current signal is transmitted over the transmission line L, the levels are indicated by the threshold S1 and S2 at the outputs thereof by means of specified logic signals. Now, if in response to an error on the line L an over-current appears on said line, it is detected by the threshold element S3. Now, the threshold S1 and S3 are so interconnected by means of a separate line that the logic output signal of the threshold circuit S1 is reversed by the output signal of the threshold circuit S3. Thus, a unique or in fact paradoxical line condition is indicated at the outputs of the threshold S1 and S2. This unique or paradoxical line condition is distinguished by the fact that the conduction current is at the same time larger than J2 but apparently smaller than J1. This combination of logic output signals of the threshold S1 and S2 is so interpreted by the gates N1 to N4 that at the output of the gate N4 linked to the control input of the series line switch LS there is generated a signal, in response to which the line switch LS (e.g., consisting of a simple switching transistor) is opened. Furthermore, a timing element (e.g., a monostable trigger circuit) is so connected to the gates N3 and N4 that it is activated concurrently with the opening of the switching transistor comprising line switch LS. After a given period of time it causes a change at the output state of logic element N4, terminating the signal to the line switch LS, thereby reclosing the latter. If by this time the cause of the faulty over-current flow has not yet been removed, this process is repeated until the over-current is eliminated.

Figure 4:
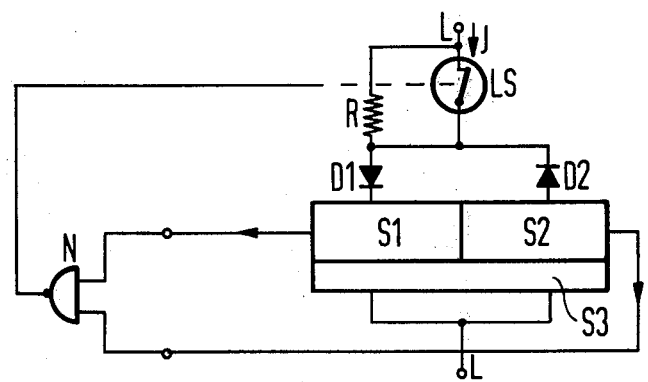
FIG. 4 shows an over-current logic circuit especially useful for a double-current signal transmission.

FIG. 4 shows a similar over-current protection system for bipolar current transmission circuits. As in the arrangement of FIG. 3, the line switch LS is connected in series with line L. Because of the bipolar current signals, however, the threshold circuits S1 and S2 are no longer connected in series but in parallel. To this end, the line L is divided into two parallel branches, the conducting directions of which are determined by the diodes D1 and D2, respectively. The threshold circuits S1 and S2 again detect the currents J1 and J2, but this time in accordance with FIG. 2. To detect the over-current condition there is provided a third threshold circuit S3, which is connected in series to the parallel connection of the threshold circuits S1 and S2, as well as to the line L. This threshold circuit S3 detects an over-current condition in absolute terms, that is to say, both in the positive and negative range.

If an over-current condition is created, the output signal of the threshold circuit S3 is applied to the threshold circuits S1 and S2 in such a manner that logic signals are generated at the outputs thereof, which again would define a unique or paradoxical line condition. In this case, the unique line condition is distinguished by the fact that the conduction current is apparently larger than J1 and J2, i.e., both in a positive and in a negative direction. Such a combination of the output signals of the threshold circuits S1 and S2 generates over the gate N a switching signal for the line switch LS, causing the same to be opened.

In order to reclose the line switch LS, it is bridged by a high-value resistor R, through which a weak measuring current flows after the opening of the line switch LS. When the polarity of the line L is reversed in response to the data transmission, said measuring current experiences a zero-crossing. This is detected by an additional element, e.g., a resistor placed in the measuring current circuit in conjunction with a switching transistor. A signal is derived therefrom which is utilized to terminate the switching signal for the line switch LS. Consequently, by means of the high value measuring current resistor, it is possible to reclose the line switch automatically upon restoration of normal line currents. If the faulty overcurrent still flows after the closing of the line switch LS, the interrupt process is repeated in this case also.

In conclusion, it is pointed out that the use of a high value measuring current resistor as means for developing a signal for the automatic closing of the line switch LS can likewise be utilized for unipolar current transmission circuits. Conversely, the timing element Z can also be employed to terminate interruption of bipolar current transmission circuits.

Other modifications of the disclosed preferred embodiments may occur to one of skill in the art, without departing from the spirit of the invention which is intended to be defined only by the appended claims.

I claim:

1. A circuit arrangement for protecting a transmission circuit against over-current conditions, said circuit including at least two threshold logic elements for evaluation of current conditions on said line, characterized by, an additional threshold responsive logic element whose output is coupled to at least one of said threshold logic circuits for controlling the output signal level thereof in response to current in said circuit in excess of said threshold, overcurrent logic signalling means having an input connected to the output of said two threshold logic elements, a line switch connected in said transmission circuit for controlling the passage of said current to said threshold logic elements, the state of said switch being fixed by the output of said over-current logic signalling means, whereby said switch is opened upon indication of the over-current condition by said two threshold devices, and a supplementary monitoring circuit having an output directed to said switch for returning the state thereof to the initial condition, thereby reclosing said line switch.

2. The circuit of claim 1 wherein the input of said supplementary monitoring circuit is controlled by the output of said two threshold responsive elements, to initiate operation thereof substantially concurrently with opening of said line switch.

3. The circuit arrangement of claim 2 wherein said supplementary monitoring circuit comprises a timing element whose output returns to normal a predetermined period of time after the opening of said line switch to restore said line switch to the closed position.

4. The circuit arrangement of claim 2 wherein said two threshold elements have different threshold and provide two output signals to indicate in digital coded form the magnitude of the current, relative to said two thresholds, the output of one of said threshold elements being altered by the response of said additional threshold element to said over-current condition so that the outputs of said two threshold devices define a current condition which cannot exist on the transmission circuit.

5. The circuit arrangement of claim 4 wherein said supplementary monitoring circuit comprises a timing element whose output returns to normal a predetermined period of time after the opening of said line switch to restore said line switch to the closed position.

6. A circuit arrangement for protecting a transmission circuit against over-current conditions, said circuit including at least two threshold logic elements for evaluation of current conditions on said line, characterized by an additional threshold responsive logic element whose output is coupled to at least one of said threshold logic circuits for controlling the output signal level thereof in response to current in said transmission circuit in excess of said threshold of said additional threshold element, over-current logic signalling means having an input connected to the outputs of said two threshold logic elements, a line switch connected in said transmission circuit for controlling the passage of said current to said two threshold logic elements, the state of said switch being fixed by the output of said over-current logic signalling means, whereby said switch is opened upon indication of the over-current condition by said two threshold devices, and a supplementary monitoring circuit having an output connected to said evaluating logic elements for maintaining said elements responsive to the next succeeding change of condition on said line, said two threshold logic elements thereby remaining responsive to said line current for restoring said line switch to the initial closed condition thereof.

7. The circuit arrangement of claim 6 wherein said two threshold elements have different threshold and provide two output signals to indicate in digital coded form the magnitude of the current, relative to said two thresholds, the output of one of said threshold elements being altered by the response of said additional threshold element to said over-current condition so that the outputs of said two threshold devices define a current condition which cannot exist on the transmission circuit.

8. A circuit arrangement as claimed in claim 3 wherein said supplementary monitoring circuit comprises a high value resistance element bridging said line switch, said resistance element providing at least a weak line current indication to said two threshold logic elements under over-current conditions, said two threshold logic elements responding to the next succeeding change in polarity of current on said line to change their output to said over-current logic switch signalling means.

9. The circuit arrangement of claim 8 wherein said two threshold elements have different threshold and provide two output signals to indicate in digital coded form the magnitude of the current, relative to said two thresholds, the output of one of said threshold elements being altered by the response of said additional threshold element to said over-current condition so that the outputs of said two threshold devices define a current condition which cannot exist on the transmission circuit.

* * * * *